No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 1.
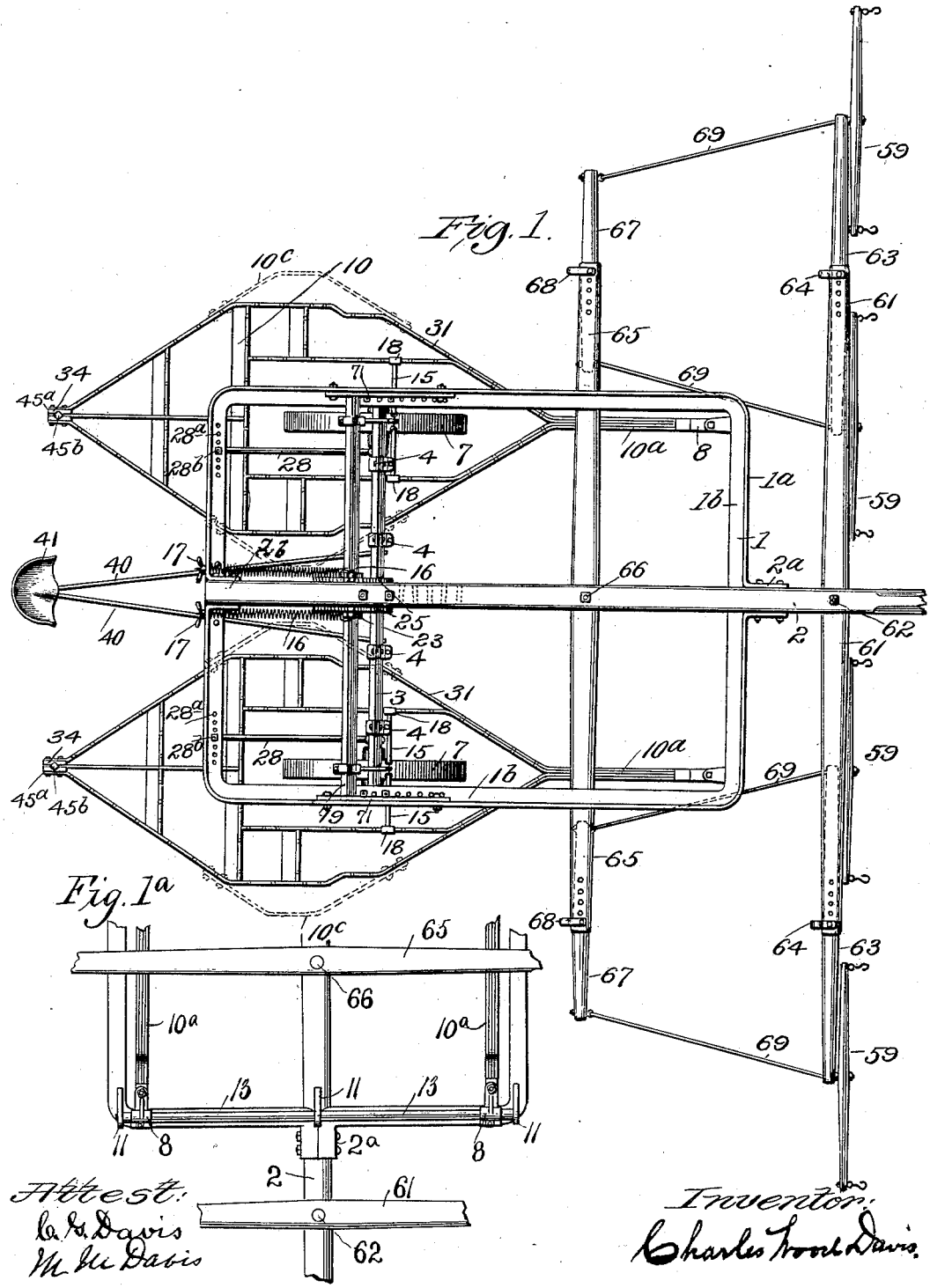

No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 2.
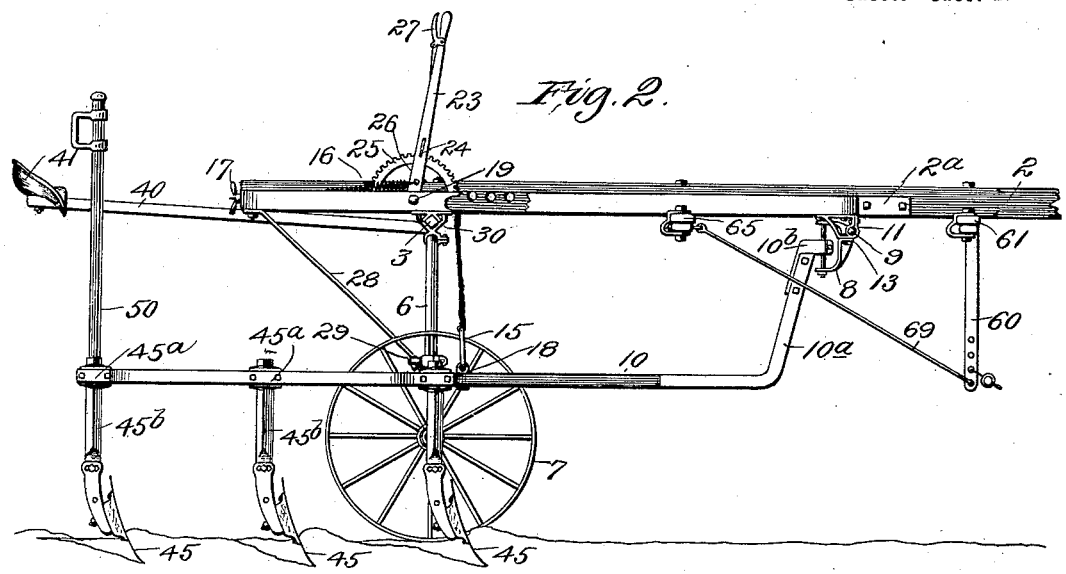
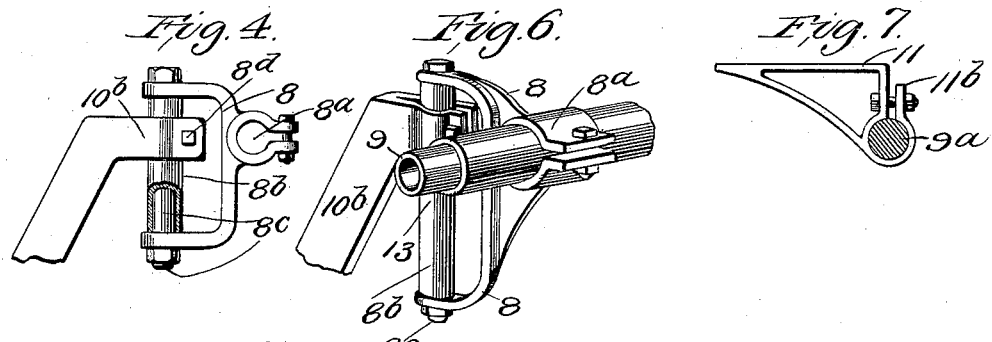
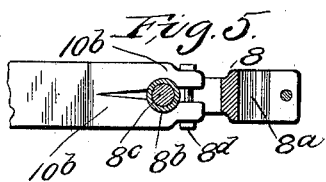
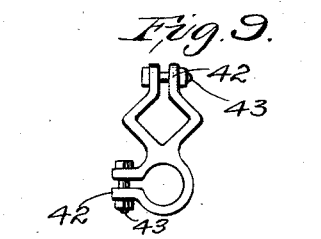
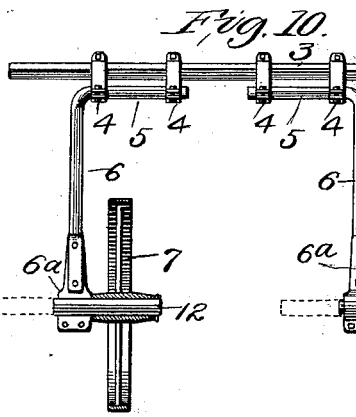
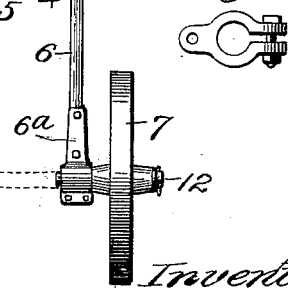
Attest:
C. H. Davis
M. M. Davis
Inventor:
Charles Wood Davis.
THE NORRIS PETERS CO., PHOTO-LITHO., WASHINGTON, D. C.

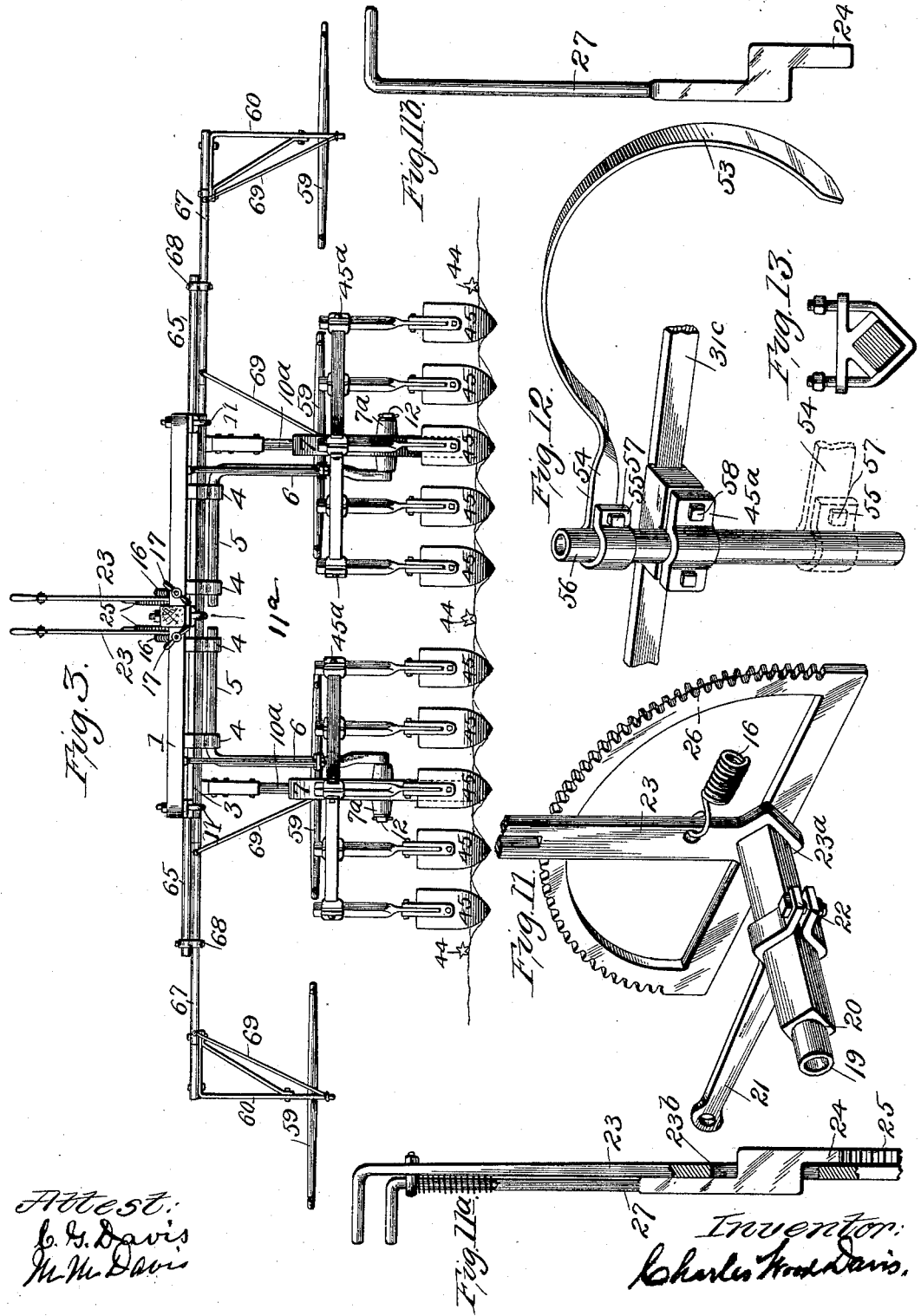

No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 4.
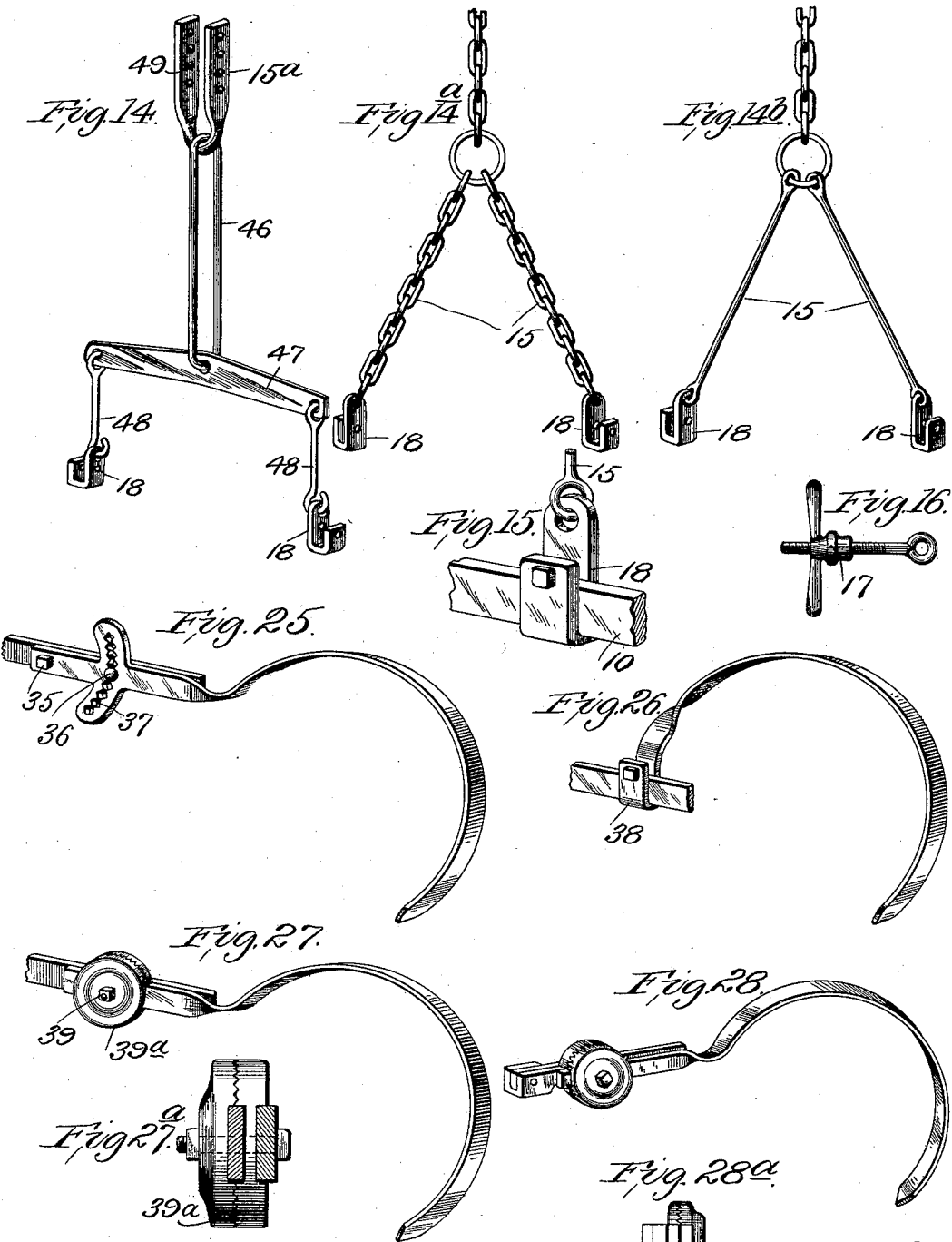

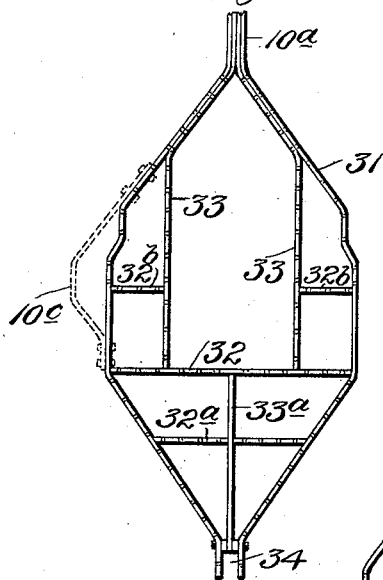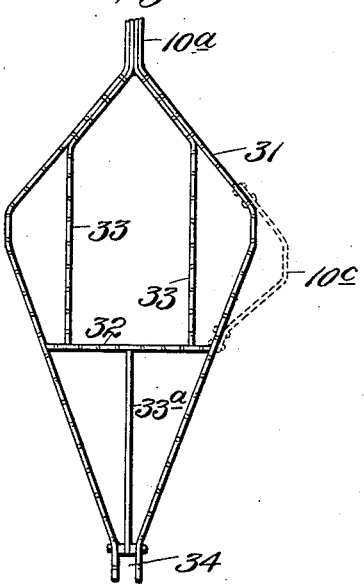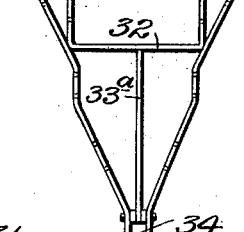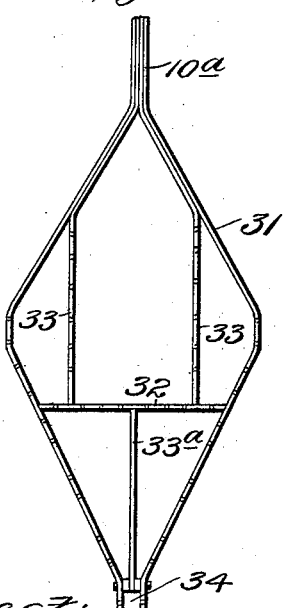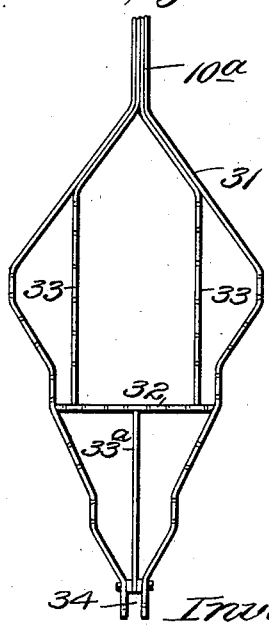

Figure 30A:
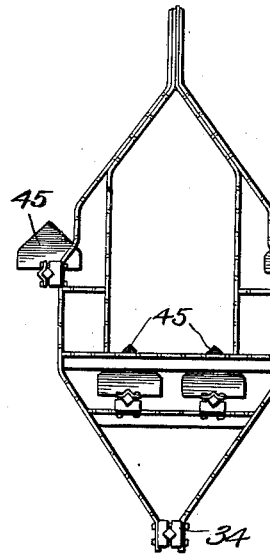
Figure 30B:
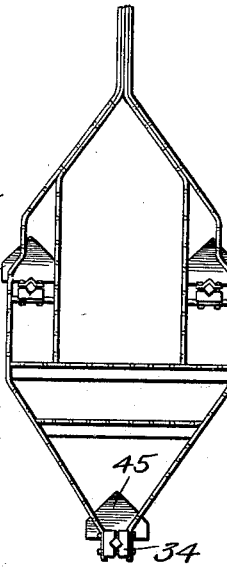

No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 6.
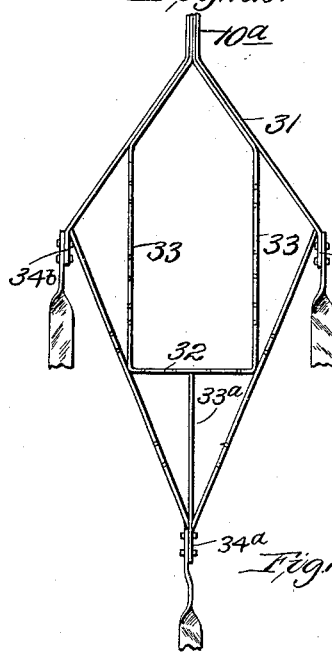
Fig. 22.
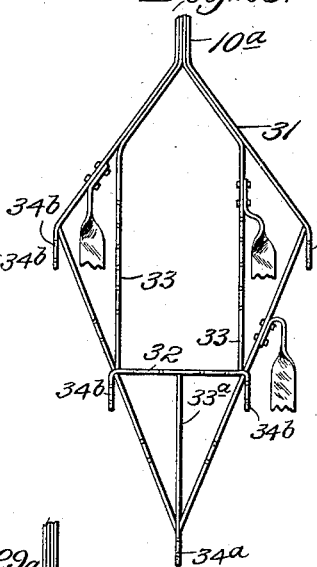
Fig. 23.
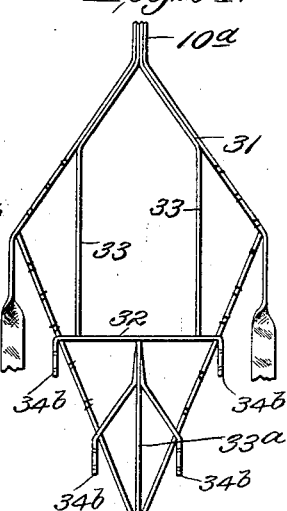
Fig. 24.
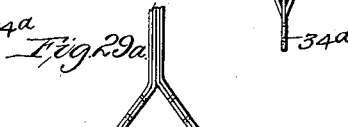
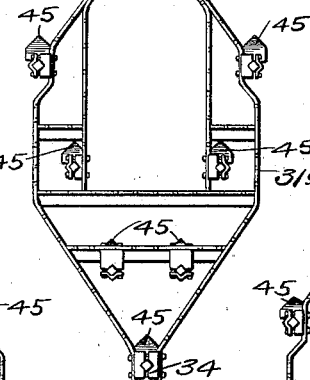
Fig. 29.
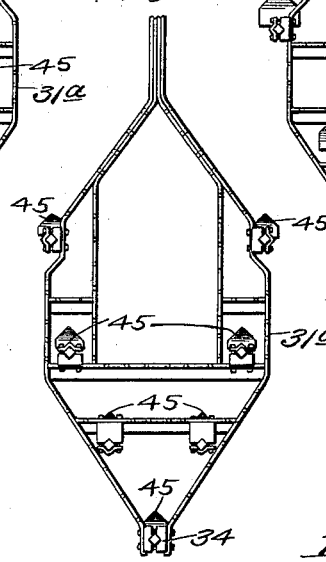
Fig. 29a.
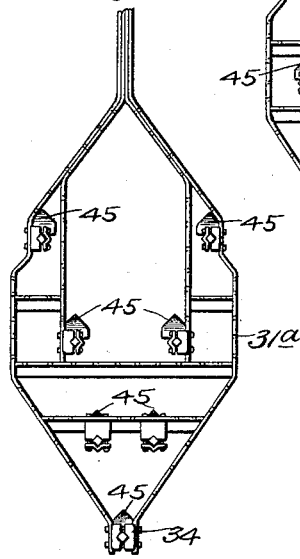
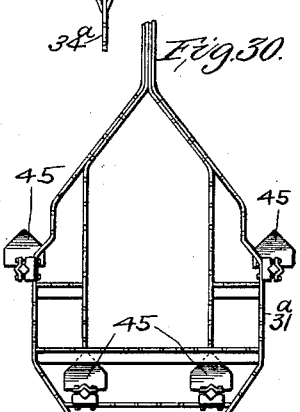
Fig. 30.
Attest:
C. G. Davis
M. M. Davis
Inventor:
Charles Wood Davis No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 7.

Attest:
C. G. Davis
M. M. Davis.

Inventor:
Charles Wood Davis

No. 609,611. Patented Aug. 23, 1898.
C. W. DAVIS.
CULTIVATING AND SOIL STIRRING DEVICE.
(Application filed May 21, 1897.)
(No Model.) 8 Sheets—Sheet 8.
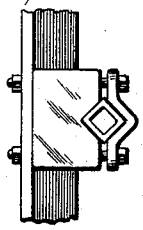
Fig. 32.
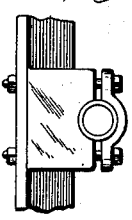
Fig. 32b.
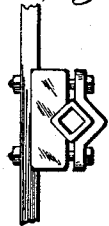
Fig. 33.
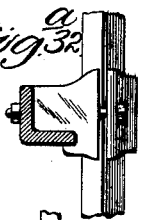
Fig. 32a.
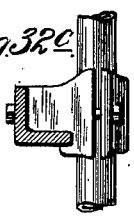
Fig. 32c.
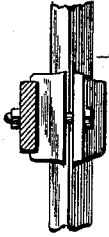
Fig. 33a.
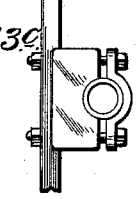
Fig. 33c.
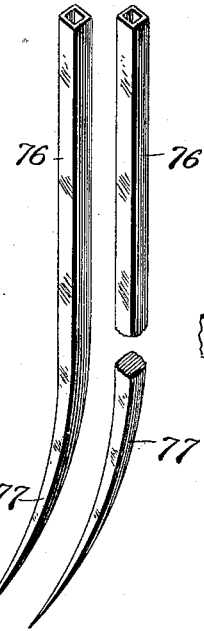
Fig. 36.
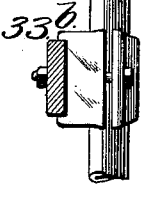
Fig. 33b.
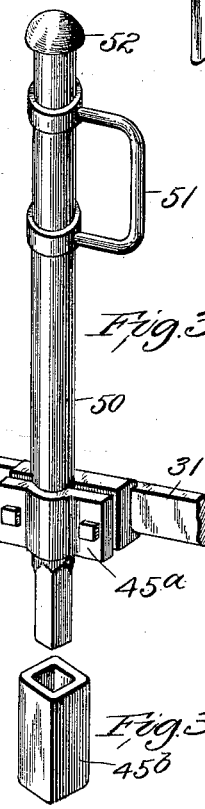
Fig. 34.
Fig. 34a.
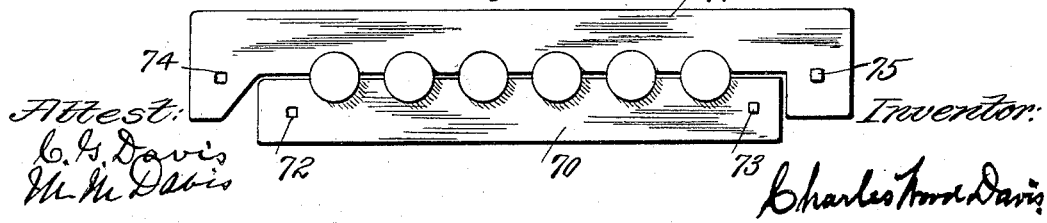
Fig. 35.
Attest:
C. G. Davis
M. M. Davis
Inventor:
Charles W. Davis

UNITED STATES PATENT OFFICE.

CHARLES WOOD DAVIS, OF NEAR PEOTONE, KANSAS.

CULTIVATING AND SOIL-STIRRING DEVICE.

SPECIFICATION forming part of Letters Patent No. 609,611, dated August 23, 1898.

Application filed May 21, 1897. Serial No. 637,633. (No model.)

*To all whom it may concern:*

Be it known that I, CHARLES WOOD DAVIS, a citizen of the United States, residing near Peotone, Viola township, Sedgwick county, in the State of Kansas, have invented certain new and useful Improvements in Cultivators and Soil-Stirring Implements, of which the following is a full, clear, and exact description, reference being had to the accompanying drawings, forming part of this specification.

My invention relates to features of construction applicable for the most part to either riding or walking cultivators and to either double-row cultivators or to those implements intended to stir the soil generally, as in fallowing, working stubbles, cultivating orchards, and in covering seed sown broadcast.

One object of my invention is to provide implements to which may be applied gang-frames laterally adjustable relatively to other parts and adapted to double-row tillage or in which the gang-frames may be disposed close together to cover the whole of a given space or spread as widely apart as possible and extensions added to their sides to adapt them to cover the whole of wider spaces, as may be desired.

A further object is to provide a suitable elevating mechanism adapted to take any desired part of the weight of the gang-frame off the soil-stirring parts or lift such frame and attached parts from an operative position and which is adapted to constitute a device which will hold soil-stirring parts in adjustment to penetrate the earth to a given depth, thus adapting the implement to tillages of uniform depth over given areas.

Another object of said invention is in the case of riding-cultivators to adapt the elevating mechanism to aid in balancing the implement while the operative workman occupies the seat provided for his carriage and to balance riders of different weights.

A further object is to provide gang-frames adjustable in such a manner, both as respects the width of surface they cover and the number and disposition of soil-stirring parts which may be attached thereto, as well as in their relation to other parts, as to adapt the cultivator of which they are a part to the tillage of entire row-spaces at one operation and to the working of entire row-spaces of different widths, and thus greatly reduce the labor and cost of growing rowed crops, as well as greatly lessening the labor and cost of stirring the surface of fallows, stubbles, and orchards and fields sown broadcast.

A further object of my invention is to so construct the gang-frames and other parts of the implement that the wheels may travel each respectively in a suitably-disposed opening provided for that purpose in the central forward part of a gang-frame and still move in the middle of the respective row-spaces being tilled.

A further object is to provide gang-frames and attaching-shanks, whereby said frames may be equipped at will with shovels for cultivating or equipped with a special form of pointed rectangular tooth which I have provided and which is adapted to stir and fine the surface soil without inverting or moving said soil out of place, or provided with "eagle-claws" or provided with spring-teeth to form a spring-tooth harrow of the width of the two gang-frames which may have been attached thereto or of a greater width obtained by the addition of side extensions made for the purpose, each and all of the said conversions being effected by simply removing one part of the soil-stirring parts and substituting others of the appropriate kind whenever it is desired to convert the implement. All these conversions are obtained without the expense of providing or the labor of attaching a special form of gang-frame for each change desired.

Other objects of my invention are to so improve and simplify various details of construction as to secure durability and efficiency of the implement while greatly lessening the labor and cost of tillage.

My invention consists in certain novel features of construction hereinafter fully described, as well as pointed out in the claims hereto appended, and which are made a part of this application.

Figure 31:
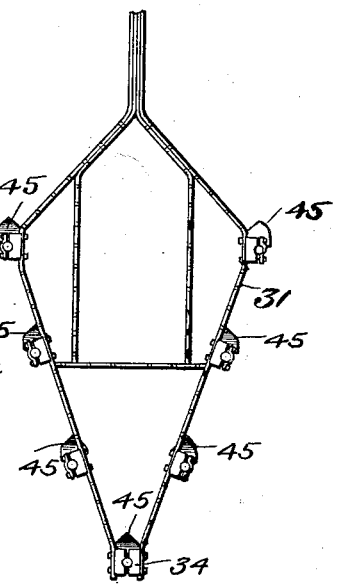
Figure 31A:
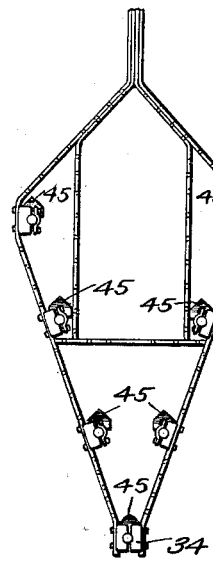
Figure 31B:
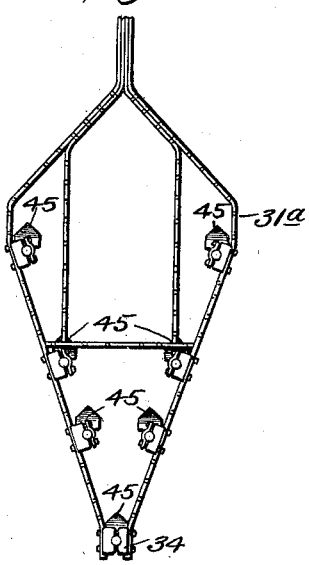
Figure 31C:
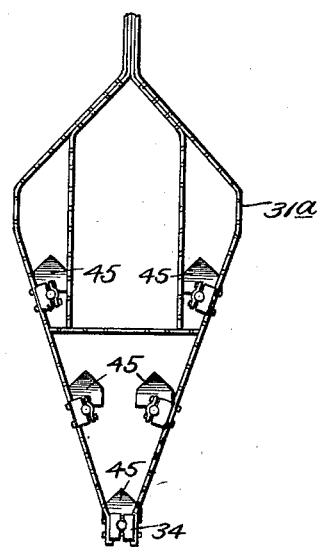

In the accompanying drawings, Figure 1 is a plan of the implement constructed in accordance with my invention. Fig. 1ª shows a fragmentary view of the under side of the frame. Figs. 2 and 3 are respectively a side elevation and a front view of the implement. Fig. 4 is a detail of the stirrup employed in connecting the gang-frame and related parts to the draw-head. Fig. 5 is a detail of a bifurcated connecting part. Fig. 6 represents the draw-head as preferably made of tubing and the manner of its connection with the stirrup. Fig. 7 represents a bracket which may be used in mounting the draw-head and other parts of the implement. Fig. 8 is a detail of a clamping-collar employed in adjustably connecting braces with arms of the divided arch. Fig. 9 is a detail of the twin collar used in mounting the arch-bar above the divided arch. Fig. 10 represents the arch and related parts, with means for adjusting the wheels either inside or outside thereof and showing reversible axles and means for their attachment. Figs. 11, 11$^a$, and 11$^b$ are details of an elevating mechanism adapted to lift the whole or any part of the weight of a gang-frame and attached parts and to be shifted longitudinally as well as to have its lifting-arm shifted laterally. Fig. 12 represents an improved form of spring-tooth and a straight shank, as well as a part of a gang-frame to which shank and tooth are preferably connected by the notched clamp shown. Fig. 13 is a detail showing the notched seat and U-bolt employed in securing the arch-bar to the main frame. Fig. 14 is a detail of the lifting-bail as preferably constructed. Figs. 14$^a$ and 14$^b$ represent modified forms of the lifting-bail which I may use. Fig. 15 is a detail of a clamp employed to adjustably secure the lifting-bail to the gang-frame. Fig. 16 illustrates a "hand-screw" adapted to regulate the power exerted by coiled extension-springs. Figs. 17 to 24, inclusive, illustrate a series of embodiments of certain novel features of gang-frames as preferably constructed. Figs. 25, 26, 27, 27$^a$, 28, and 28$^a$ are details of improved forms of spring-teeth and means for their attachment to members of implements adapted to receive soil-stirring parts. Figs. 29, 29$^a$, and 29$^b$ represent a gang-frame with soil-stirring parts so disposed as to cultivate row-spaces of different widths while maintaining said parts in the same relative positions and so spaced as to provide ample room for the passage of trash or litter between them. Figs. 29$^b$, 30, 30$^a$, and 30$^b$ illustrate a gang-frame equipped with different numbers of soil-stirring parts and showing preferable dispositions thereof when numbers are so varied. Figs. 31, 31$^a$, 31$^b$, and 31$^c$ illustrate a gang-frame adapted to have all the soil-stirring parts in use disposed symmetrically in lines projecting on each side thereof from a centrally-disposed rear socket and secured to either the inside of the border or the outside of the border of said frame to so dispose said soil-stirring parts upon said gang-frame in lines diverging from a given point that they shall retain the same relative positions, yet be adapted to the cultivation of row-spaces of different widths, and to adapt said gang-frame to have the number of attached soil-stirring parts varied at will and still have such parts preserve their arrangement in evenly-spaced positions along the border of said frame in lines diverging from a given and common initial point. Figs. 32, 32$^a$, 32$^b$, and 32$^c$ represent a notched clamp adapted to secure shanks of soil-stirring parts to angle-bar members of an implement, said members having both vertical and horizontal flanges. Figs. 33, 33$^a$, 33$^b$, and 33$^c$ are details of a notched clamp adapted to secure the shanks of soil-stirring parts to either flat or rectangular members of an agricultural implement. Figs. 34 and 34$^a$ represent a hand-staff adapted to be employed in securing lateral deflection or movement of gang-frames. Fig. 35 is a detail of a clamping notched rack adapted to be employed in providing for the longitudinal adjustment or shifting of the parts of the elevating mechanism carrying the lifting-arm thereof. Fig. 36 represents a special form of soil-stirring tooth adapted to stir and fine the surface without inverting or moving the soil to or from rows of plants, being intended and adapted to secure level culture.

My improved implement comprises a main frame 1, adapted to be mounted in connection with a tongue 2 and supported by an arch-bar 3, which is secured, preferably, by twin collars 4 to the divided arch 5, upon the depending arms 6 of which are mounted the wheels 7. Near the forward end of the main frame 1 the stirrup 8 connects the draw-head 9 with the gang-frame 10 through the medium of the bifurcated connecting part 10$^b$ and the draw-bar 10$^a$. The draw-head 9 preferably extends from side to side of the main frame 1 and is in a preferable construction suspended below the main frame 1 and the tongue 2 by means of brackets 11 and 11$^a$. (See Figs. 2, 3, and 7.) In the central forward part of the gang-frame 10 is an opening in which travels the wheel 7 upon the axle 12, which extends horizontally from the depending arm 6 of the divided arch 5. The gang-frames 10 have adjustable draft connection with the main frame 1 through the draw-bars 10$^a$, the bifurcated part 10$^b$, and the laterally-shifting stirrups 8, which are clamped upon the sleeves 13, surrounding the respective halves of the transverse bar of the draw-head 9, said sleeves being confined laterally in a preferable construction by brackets 11. Stirrups 8 are so constructed as to adapt the gang-frames 10 to be elevated or deflected laterally, and are shiftable by means of clamps 8$^a$ upon sleeves 13 in a manner to adapt the gang-frames 10 to be adjusted on the draw-head 9 to row-spaces of different widths.

The draw-head consists, essentially, of a transverse member divided concentrically into an outer rotating part 13 and an inner fixed supporting part 9, (see Fig. 6;) and, as shown in Fig. 1$^a$, the inner fixed part 9 is secured by a bracket 11 at an intermediate point to a centrally-disposed part 2 of the wheeled frame 1 and at its outer ends by other brackets 11 to the outer sides of said frame, while the rotating part of the draw-head is divided transversely into two independently-rotatable parts, which respectively extend from the central bracket 11 to an outer bracket 11, and are thus confined upon the inner fixed part of the draw-head. The advantages of this arrangement are that the gang-frame connection may be clamped tightly upon the rotating part of the draw-head, thus avoiding the use of abutting collars, and may be shifted laterally at will to any extent by simply loosening a single clamp, while the rotating portion of the draw-head is confined by the means for clamping the fixed portion in place and avoids the use of extra clamps upon said fixed portion.

Figs. 11, 11$^a$, and 11$^b$ illustrate an elevating mechanism connected with the gang-frame 10 through the lifting-bail 15, said mechanism being supplemented by the auxiliary spring 16, the tension of which is adjustable by means of the hand-screw 17. The lifting-bail 15 spans the wheel-opening and the wheel 7 and is preferably secured to the gang-frame 10 through the medium of clamps 18. Preferably the elevating mechanism comprises a non-rotating shaft 19, extending from the side or border of the main frame 1, where it is adjustably secured by means of the notched clamping-rack (shown in Fig. 35) to the tongue 2 or other centrally-disposed part, where it is also adjustably secured. This clamping-rack comprises, as will be seen, two elongated plates 70 and 71, having their contiguous edges formed with a series of corresponding semicircular clamping-sockets. The lower plate is provided with bolt-holes 72 and 73, while the upper plate has bolt-holes 74 and 75 formed in the downwardly-projecting ends of said plate 71. The inner side 74$^a$ of one of the projections is cut away, so that in opening the clamping-rack it is simply necessary to remove the bolt from the hole 75 and to swing the plate 71 up upon the pivot provided by the bolt which enters the hole 74. Upon said shaft 19 rotates a tube 20, preferably square, upon which a lifting-arm 21 is adjustably secured by the integrally-formed clamp 22. To the projecting end of said arm is connected a looped part 15$^a$ of the lifting-bail 15, by means of which said elevating mechanism has adjustable connection with the gang-frame 10. Near the tongue 2 or other part to which the elevating mechanism is centrally secured lever 23 is mounted by means of the integrally-formed socket 23$^a$ upon the inner end of the rotating tube 20. Lever 23 is equipped with a trip-rod 27, which operates the dog 24, that is formed integrally by the lower end of said trip-rod, and which dog works through a slot in lever 23, being thereby adapted to engage notches 25 in the segment-rack 26 upon the side of lever 23 opposite that upon which the hand part of said trip-rod is placed, said segment-rack being secured to the tongue or other centrally-disposed part of the implement. By moving lever 23 the tube 20 and the lifting-arm 21 are made to rotate in a measure corresponding with the movement of said lever, adapting said mechanism to the removal of any portion of the weight of the gang-frame 10 from the soil-stirring parts, to the regulation of the penetration of such parts, and the lifting of said parts out of operative position. By means of the notched clamping-rack shown in Fig. 35 and a series of perforations in the centrally-disposed part of the implement, to which the elevating mechanism may be secured, said mechanism is adapted to be shifted longitudinally in a manner to secure the balancing of the weights of different workmen. The lifting-arms 21 are adjustable by means of integrally-formed clamps 22 upon the rotating tube 20 in such a manner as to adapt their positions relatively to the positions of the gang-frames 10 when said frames shall have been adjusted to cultivate wider or narrower row-spaces.

The spring 16 performs an important function, being connected at one end with the lever 23 above the connection of the latter with the rotating tube 20 and at its opposite end with the hand-screw 17, which secures it to the rear part of the main frame 1 and serves to regulate its tension and the power which it exerts. Thus connected spring 16 has sufficient power to lift the whole or any part of the weight of the gang-frame 10 and attached parts, and the power of the spring within its limits is regulated with precision through the medium of the hand-screw 17.

By the use of the elevating mechanism and the auxiliary parts herein described I am able to regulate the depth of tillage and make it practically uniform over given areas, as well as to measureably balance the weight of the implement, while greatly lightening the labor of its operation. By the aid of said mechanism and connected and related parts I am also enabled to hold the soil-stirring parts to adjustment at any desired depth, while changing such adjustment at will. Obviously an elevating mechanism of the character described and working independently is provided for each gang-frame.

The main frame 1 preferably comprises a substantially continuous border or rim and is preferably made in two halves, each providing one side and two end portions of the frame of angle-bar, each half providing one side and two end portions of angle-bar, with a vertical flange 1$^a$ projecting upward on the outer edge and a horizontal flange 1$^b$ projecting inward and forming a seat upon which other parts may be mounted or from which they may be suspended. A portion of the vertical flange 1$^a$ of each end portion is preferably turned forward by the side of the tongue 2, to which it is bolted at 2$^a$, and the horizontal flange 1$^b$ of said end portions are also preferably turned forward under said tongue. Similar connection of the main frame 1 and the tongue 2 is made at the rear part of the implement. While such is the preferable construction and the preferable material of the main frame, I desire it understood that I confine myself neither in this nor other parts of the implement, neither to any particular construction nor to any specific material, but may vary either in any suitable manner.

The tongue 2 is secured to the main frame in the preferable construction described by bolts at $2^a$ and $2^b$.

3 represents an arch-bar, preferably tubular, suspended by the U-bolt and notched seat (shown in Fig. 13) to the horizontal flange $1^b$ of the main frame 1 and to the tongue 2 or other centrally-disposed part.

From the arch-bar 3 the divided arch 5 is suspended, preferably, by means of the twin collars 4. The arch 5 is divided centrally and the twin collars 4 are adjustable relatively to the arch-bar 3 and the divided arch 5, or to both, in order to permit lateral adjustment of the divided arch 5 and parts which it carries that the operative parts of the implement may be placed at greater or less distances apart, thereby adapting the machine to the tillage of different widths of row-spaces or to its extension to its maximum width, as shown in Fig. 1, to the better adapt it to the working rapidly of fallows, stubbles, and orchards and in covering with greater celerity seeds sown broadcast.

28 represents braces having their lower ends pivotally secured in sockets on collars 29, which are adjustably clamped to the lower parts of the depending arms 6 of the divided arch 5, while their upper ends are adjustably secured, preferably through the medium of a series of holes $28^a$ and bolts $28^b$, to the rear part of the main frame 1. By braces 28 the depending arms 6 of the divided arch 5 are securely held in vertical position and all strain from the dragging of the wheels 7 transmitted directly from said arms to the main frame 1.

The stirrup 8 has an integrally-formed clamp $8^a$, the socket of which is preferably circular and by which it is secured to sleeve 13, surrounding the respective halves of the transverse bar of the draw-head 9, which sleeve rotates freely upon its respective half of said transverse bar in a manner to permit the lifting of the connected gang-frame 10. Each sleeve 13 in the preferable construction abuts against an outer bracket 11 and an inner bracket $11^a$, bracket 11 being secured to the side of the main frame and bracket $11^a$ being secured to the tongue 2 or to some other centrally-disposed part of the implement. Between the draw-bar $10^a$ and the stirrup 8 is interposed a bifurcated connecting part $10^b$, that is held in place upon the sleeve $8^b$ by the bolt $8^d$, said bifurcated part and the attached stirrup providing means for the lateral deflection of the gang-frame 10. The connection illustrated in Figs. 1 to 6, inclusive, between the draw-bar $10^a$, the bifurcated part $10^b$, the stirrup 8, the sleeve 13, and the transverse bar of the draw-head 9 is such as to adapt the stirrup 8 to move freely with sleeve 13, surrounding the transverse bar of the draw-head 9, while such sleeve is confined laterally by brackets 11 and $11^a$, and at the same time adapting the draw-bar $10^a$ and the bifurcated part $10^b$ to swing laterally upon the stirrup 8 while confined vertically therein by means of the connecting part $10^b$ and the bolt $8^c$. Said stirrups 8, being adjustably held in position upon sleeves 13, may by means of the clamps $8^a$ be set to any new position thereon and the gang-frames 10 thereby fixed at any desired distance apart within the limits of the draw-head. The draw-bar $10^a$ is likewise adjustable upon the vertical sleeve $8^b$ by means of the bifurcated connecting part $10^b$ and the bolt $8^d$ in such a manner as to aid in regulating the penetration of the soil-stirring parts and the angle of penetration.

The wheels 7 may be shifted to conform to the distance apart of the gang-frames 10 and the stirrups 8 by shifting the parts of the divided arch 5 relatively to the arch-bar 3 by means of the twin collars 4. By such adjustments the implement may be adapted to the tillage of row-spaces of greater or less width, to the cultivation of two entire row-spaces, to the tillage of parts of row-spaces, to the stirring of the surface of fallows, stubbles, and orchards, and to the expeditious covering of seeds sown broadcast. Moreover, as will hereinafter appear more specifically, I provide lateral extensions $10^c$, which may be employed for widening the gang-frames 10 and the scope of the entire implement as well, either for the working of unusually wide row-spaces or for stirring the whole of given portions of the ground, as may be desirable in working fallows, stubbles, and orchards and in broadcast seeding, or for the purpose of converting the implement into a spring-tooth or ordinary toothed harrow of great capacity.

While I preferably employ, in connection with other features of my invention hereinbefore described, certain forms of gang-frames, it is evident that said previously-described features, as well as others hereinafter described, are not limited in their use to any specific form of gang-frame or for the most part to any particular form or construction of the main frame 1. I may also employ either the straight shank or the curved shank for attaching shovels, teeth, spring-teeth, sweeps, hillers, scrapers, or other soil-stirring parts, and such shanks may be separate from such parts or formed integrally therewith. I may use notched clamps adapted to engage shanks of circular, square, or other section and designed to secure said shanks to members of either flat, rectangular, or angle-bar section, or I may employ other suitable means for securing shanks of soil-stirring parts to the implement. The forms of gang-frames which I shall describe are adapted for the attachment, as well as the interchange, of all ordinary forms of shovels, teeth, spring-teeth, "eagle-claws," sweeps, hillers, scrapers, and other forms of soil-stirring parts used in connection with cultivators and such special forms as I shall describe herein or have described in my former applications, and the gang-frames I shall describe are each adapted to cover the whole or a part of a row-space and to constitute, with other parts, an implement adapted to the simultaneous tillage of two entire row-spaces, to the cultivation of fallows, stubbles, orchards, nurseries, and plantations, and to the concurrent use of two or more forms of soil-stirring parts, as well as to the use of varying numbers thereof, while being adapted to the rapid covering of seeds sown broadcast.

Gang-frames as I preferably construct them comprise a substantially continuous border 31, transverse bars 32 and $32^a$ and $32^b$, and longitudinal bars 33 and $33^a$, which border and bars by their disposition constitute a wheel-opening in the central forward portion of the gang-frame 10, in which the wheel 7 may travel in the row-space being tilled. Said wheel-openings are of such size and shape and so disposed relatively to other parts as to permit such lateral swinging of the gang-frame 10 as may be requisite in the tillage of crooked rows or to dodge plants standing out of line. The draw-bars $10^a$ are preferably made integrally with the gang-frames 10 by extending the borders 31 for that purpose. In case it is desirable to extend the gang-frames 10 laterally it may be done by the use of parts which I have invented for that purpose, the outlines of some of said extensions being indicated in Figs. 1, 17, and 18, and which have been fully described in my former applications. In Figs. 1, 17, and 18, said extensions are indicated by dotted lines numbered $10^c$.

Further features of my invention relate especially to the construction of gang-frames as illustrated in Figs. 17 to 24, inclusive, where are shown various forms of gang-frames, in all of which substantial unity of design and common principles of construction are embodied. One common feature so illustrated is the same general configuration with converging sides, forming tapering ends and constituting what may be termed "rhombic" forms. A second feature common to all said frames is the practically continuous border 31. A third common characteristic in the preferable construction is shown in the integrally-formed draw-bars $10^a$. A fourth common feature is the transverse bar 32, which gives strength and rigidity to the frame and in all these forms constitutes the rear boundary of the wheel-opening. A fifth characteristic possessed in common by all the forms of gang-frames illustrated is the disposition of the longitudinal bars 33, which form the sides of the wheel-openings, give stability to the frame, serve, preferably, to carry the lifting-bail, and afford, as indicated by marks representing perforations, added means and positions for attaching soil-stirring parts, more particularly desirable when the maximum number of spring-teeth are in use. A sixth common feature in all the frames illustrated is the longitudinal bar $33^a$, which serves to brace the transverse bars and adds much to the strength of the frame. A seventh characteristic possessed by all the gang-frames herein illustrated is the extension diagonally forward of longitudinal bars 33, which, while thus made to aid in integrally forming the draw-bars $10^a$, serve the important function of reinforcing that part of the gang-frame to which strain from all the soil-stirring parts in use is transmitted. An eighth common feature is the general uniformity in the construction of the several frames shown, which is such as to afford the widest means for attaching and disposing soil-stirring parts, while dispensing with superfluous material and weight. A ninth and important common characteristic of the several frames shown is the centrally-disposed wheel-opening in the forward part of each and which is so arranged and located relatively to the parts to which soil-stirring devices may be attached that ample room is provided for the lateral swinging of the gang-frame when employed in cultivation, and yet such devices be so disposed that the earth moved in tillage will not obstruct the free movement of the wheels, which are thus adapted to travel in advance of said soil-stirring parts and upon earth not freshly moved or loosened. A tenth feature possessed in common by all the gang-frames herein illustrated is that all parts of the bars and diagonal sections of the borders, as well as the straight longitudinal sections thereof, are adapted to receive and are intended to receive and have attached thereto, as indicated by representations of perforations, the soil-stirring parts in ordinary use upon cultivators and any one of the forms of spring-teeth herein shown and described or that have been shown or described in applications which I have previously filed. An eleventh feature common to all said gang-frames is their adaptation to receive and carry side extensions in the manner shown by dotted lines in Figs. 1, 17, and 18. A twelfth common characteristic possessed by the gang-frames herein illustrated is their adaptation to the arrangement of soil-stirring parts in lines diverging from a given point and which is more particularly shown in Figs. 29, $29^a$, $29^b$, 30, $30^a$, $30^b$, 31, $31^a$, $31^b$, and $31^c$.

A feature common to the gang-frames shown in Figs. 17 to 21, inclusive, is an integrally-formed socket 34, adapted to receive a a shank, to which a soil-stirring part may be attached. It is evident that such a socket might be integrally formed in and as a part of the gang-frames illustrated in Figs. 22, 23, and 24 and is therefore common to all the gang-frames shown herein.

Another feature common to the gang-frames shown in Figs. 22, 23, and 24 is the longitudinal terminals 34ª and 34ᵇ for the attachment of soil-stirring parts with curved shanks, which may be either bolted to said terminals, as shown in Fig. 22, or be made integrally therewith, as shown in Fig. 24. This feature is, moreover, applicable to all the forms of gang-frames I have herein illustrated or described, and the borders of the gang-frames shown in Figs. 22, 23, and 24 may be made with straight longitudinal side sections, as in the other forms illustrated, instead of with longitudinal terminals, as shown.

In Fig. 17 is illustrated a gang-frame differing somewhat in special features from those illustrated in Figs. 18 to 24, inclusive, inasmuch as it has several transverse bars and an offset in its straight longitudinal side section. Said transverse bars are of angle-section with vertical and horizontal flanges, (shown in Figs. 29, 29ª, 29ᵇ, 30, and 30ª,) as affording by its greater transverse section wider range for the distribution of soil-stirring parts in lines diverging from a rear socket, and thence projecting forward at angles that will so dispose said parts that the distance apart laterally of the forward soil-stirring members may be adapted to the width of the row-spaces which it may be desired to cultivate at any given time. This feature of the adaptability of this form of gang-frame to the working of wider or narrower row-spaces is clearly illustrated in Figs. 29, 29ª, and 29ᵇ, as is the adaptation of said frame to receive and dispose in symmetrical diverging lines soil-stirring parts in varying numbers and of different sizes in Figs. 29ᵇ, 30, 30ª, and 30ᵇ. It is obvious that even greater numbers of soil-stirring devices may be attached to said gang-frame and maintain symmetry of arrangement and such equable spacing as to adapt them to a great range of work.

In Fig. 18 is illustrated a gang-frame that while possessing many features in common with all the other forms herein shown possesses special features in addition and which are clearly delineated in Figs. 31, 31ª, 31ᵇ, and 31ᶜ. In said figures the soil-stirring parts 45 are disposed in lines diverging from the centrally-disposed rear socket 34, and the several soil-stirring parts 45 in each line are attached all either to the exterior or all to the interior of the border 31. By attaching all of said parts 45 exteriorly to the border 31 the gang-frame is adapted to work wide row-spaces. By placing all the parts 45 on the inside of said border 31, yet directly opposite the positions they respectively occupied outside the border, said gang-frame is specially adapted to the tillage of row-spaces of less width. By reducing the distance between the soil-stirring part 45 secured in the socket 34 and the soil-stirring part 45 placed farthest therefrom on each of the diverging lines and disposing them all upon the inside of the border 31 said gang-frame is adapted to still narrower row-spaces. By again reducing said distances and, if desired, reducing the number of soil-stirring parts on each diverging line and again placing them all within the border 31 the gang-frame is adapted to another width of row-space and may in like manner be adapted to still another. As soil-stirring parts 45 may be attached at any point either interiorly or exteriorly upon said border 31 between the socket 34 and the straight side section 31ª, it is obvious that said gang-frame is adapted to the disposition of soil-stirring parts in a great number of positions and have them maintain similar symmetrical arrangements as those herein described and illustrated in the figures mentioned and that, therefore, said gang-frame is, as designed, adapted to the tillage of row-spaces differing much or little in width. It is also obvious that the number, size, and kind of soil-stirring parts which the gang-frames illustrated in Figs. 17 and 18, as well as in Fig. 1, are adapted to receive are within a very wide range variable at will, as may be their disposition and arrangement upon said frames.

While I have shown and described various modes of disposing, arranging, and adjusting, as well as attaching, soil-stirring parts upon gang-frames, I desire it understood that in all the gang-frames herein shown soil-stirring parts may be attached to the bars and borders of said frames, as indicated by marks representing perforations, and that it is often desirable to vary both the disposition and number, as well as the kind, of said parts, and especially to vary the number and disposition of spring-teeth, and to such variations each and severally the gang-frames I have herein illustrated are specially adapted.

The offset formed in the longitudinal side section of the gang-frame shown in Fig. 17 has been provided to secure additional distribution of soil-stirring parts and in order that one such part on each side of the gang-frame may occupy a position which will bring the center of its shank practically in line with the center of the border 31 in the main side section 31ª, which arrangement is shown in Fig. 29ª. By this arrangement the gang-frame is made adjustable in a very exact manner to an additional width of row-space.

To further facilitate the disposition, attachment, and arrangement of soil-stirring parts upon gang-frames, whether made of flat or rectangular bars or tubes or of angle-bars with vertical and horizontal flanges, I have invented various forms of clamps, some of which and their modes of application and attachment are illustrated in Figs. 32, 32ª, 32ᵇ, 32ᶜ, 33, 33ª, 33ᵇ, and 33ᶜ.

It is obvious that all the forms of gang-frames which I have illustrated herein may be attached to and used in connection with the wheeled portion of my improved implement and said gang-frames may be employed interchangeably for different tillages, and it should be observed that while I have shown various embodiments of the novel features of the gang-frames which I have invented said features are nevertheless adapted to be all combined in a single structure.

While I have shown and described gang-frames as I preferably construct them, it should be understood that I do not confine myself to said forms, but may use any suitable form adapted to be employed in connection with other parts of my improved implement.

In Fig. 7 is shown a bracket which may be used in mounting the draw-head 9 and the elevating mechanism or other parts of my improved implement and which is provided with an integrally-formed tightening-clamp adapting the bracket to be used as a boxing in which journaled parts may rotate, or the clamp may be tightened about such a part as the transverse bar of the draw-head 9 for the purpose of holding it immovably.

Fig. 9 illustrates an improved form of my twin collar. In this improved form one socket is adapted to receive a square member, thereby preventing members connected vertically by such collars assuming horizontal positions relatively to one another when the collars on either are loosened, while assuring rigid attachment of the connected members when the integrally-formed clamps 42 shall have been drawn tightly together by the bolts 43. This form of the twin collar is especially adapted for mounting the arch-bar 3 of my improved implement in connection with the divided arch 5.

In Fig. 10 is illustrated a divided arch 5, on the depending arms 6 of which are carried projecting axles 12. Said axles are adjustable, as well as reversible, through the medium of the clamps 6ª, thereby adapting the wheels to be disposed either inside of the arch or outside thereof. This shiftability of the wheels 7 and that of the axles 12 adapts the wheels to adjustment in correspondence with the adjustment of the gang-frames and width of row-spaces without in all cases changing the adjustment of the relative positions of the arch-bar 3 and the divided arch 5, thus providing alternative methods of adapting the implement in some of its parts to different widths of row-spaces.

In Fig. 3 the depending arms of the divided arch 5 are shown bent toward the wheels 7 and over the axles 12, this construction being for the purpose of providing greater scope for lateral movement of the gang-frame 10 in dodging plants out of line. In same figure the stars 44 are intended to represent rows of plants, and thus show the adaptation of each gang-frame to cover and till an entire row-space.

Figs. 25, 26, 27, 27ª, 28, and 28ª illustrate new forms of spring-teeth which I have invented and means for their attachment to an implement. In the form shown in Fig. 25 a portion of the shank is enlarged and provided integrally with a transverse series of notches describing the segment of a circle, so that when the tooth is pivoted to a member of the implement by the bolt 35 the point thereof may be raised or depressed at will and then secured in the desired position by means of the bolt 36, which passes through one of said series of notches 37 and a perforation in a part of the implement that is adapted to receive soil-stirring parts. The tooth itself is formed of flat metal with its upper part twisted into a plane at a right angle to its curved body portion.

Another feature of my invention is a curved flat-metal spring-tooth, also formed by twisting its upper portion into a plane at a right angle to its curved body portion, as shown in Fig. 26, and then securing the tooth to a member of the implement adapted to receive soil-stirring parts by means of the integrally-formed clamp-socket shown, said clamp being adapted to engage such members of an implement as are adapted to receive and carry soil-stirring parts, it being obvious that the clamp 38 may be so varied as to engage either a flat, square, or circular member. That the spring-teeth which I have invented and described herein may be set in line with the longitudinal axis of the implement to which they may be attached I deflect the shanks when necessary, as shown in Fig. 23.

An additional feature of my invention is also a curved spring-tooth of flat metal with its upper portion arranged in a plane at a right angle to its body or curved portion, as shown in Fig. 27. The upper part of said tooth is secured to a suitable part of the implement by means of the bolt 39 and corrugated interlocking disks 39ª. Said disks may be attached to any part of the gang-frames I have illustrated or to other suitable frames and the point of the tooth raised or depressed at will by loosening bolt 39, and adjusting the tooth in the disks to the desired position, where it may be held by tightening the nut upon said bolt.

Another feature of my invention is likewise a flat-metal spring-tooth with its upper portion forming a plane at a right angle to its curved body portion. This tooth may be secured to any suitable part of an agricultural implement that is adapted to receive and carry soil-stirring devices of such or similar character by the means shown in Figs. 28 and 28ª.

I desire it understood that the spring-teeth herein shown and described are each and severally adapted to have the points made integrally or to have them made separately and attached in a suitable manner to the lower ends of the curved body parts of such teeth.

Fig. 16 represents a hand-screw comprising an eyebolt or other suitable part adapted for connection with the auxiliary spring 16, a threaded screw-section interposed between the eyebolt, and a hand part, which is adapted to turn upon the threaded section and regulate the spring's tension.

40 represents arms, upon which may be mounted in adjustable manner any suitable form of seat.

Fig. 12 illustrates a form of spring-tooth made of flat metal, as described and claimed in my application, Serial No. 622,808, filed February 10, 1897.

Fig. 14 represents a lifting-bail as preferably constructed, comprising a looped connecting part 15$^a$, an interposed link 46, a rocking beam 47, side arms 48, and the perforations 49. The looped part 15$^a$ is adjustably connected with the lifting-arm 21 of the elevating mechanism and permits lateral swinging of the gang-frame 10. The interposed link 46 has pivoted connection with rocking beam 47, which spans the wheel-opening above the wheel 7, and side arms 48 extend from said rocking beam to clamps 18, by means of which said lifting-bail is adjustably secured to the gang-frame 10.

Figs. 14$^a$ and 14$^b$ represent modified forms of the lifting-bail which I may use, as I may use other suitable forms.

Figs. 34 and 34$^a$ represent a "hand-staff" and means of securing it to the gang-frame that is adapted to aid in deflecting gang-frames and attached soil-stirring parts laterally when passing obstructions, dodging plants out of line, or in conforming the movements of the operative parts of the implement to the cultivation of crooked row-spaces. The staff 50 is preferably of tubing and may be secured to the border 31 of the gang-frame 10 by means of clamp 45$^a$, or its lower part may be inserted and secured by suitable means in the opening in the top of the hollow shank 45$^b$, to which the rear soil-stirring part 45 is attached, as shown in Fig. 2. The handle 51 and the knob 52 have been provided in order to give the person operating the implement a choice of parts he may grasp in swinging the gang-frame laterally.

Fig. 35 represents a notched clamping-rack adapted to engage adjustably the journaled ends of rotating shafts. This clamping-rack has been provided for the purpose of attaching to the inner margin of the main frame 1 by means of bolts 72, 73, 74, and 75, a similar rack being secured in like manner to the tongue or other centrally-disposed part of the implement. The upper section of the rack 71 is pivoted by bolt 74 to the main frame. By loosening the nut on bolt 75 one end of section 71 may be raised and the rotating parts of the elevating mechanism with the attached lifting-arm 21 moved backward or forward for the purpose of balancing the implement anew after an addition or removal of soil-stirring parts or when a workman of either greater or less weight succeeds another in the seat. It is obvious that when the rotating parts of the elevating mechanism shall have been shifted in the manner described corresponding changes should be made in the location of the lever 23 and the segment-rack 26, and such movements have been provided for by perforations in the tongue 2 in the vicinity of its connection with the arch-bar 3.

Fig. 36 represents a special form of soil-stirring tooth provided for use in connection with other parts of my improved implement. In connection with said implement this form of tooth is adapted to stirring and fining surfaces which it is desired should be kept perfectly level. For lightness the upper section of the tooth is preferably made hollow, and to secure the best work in the cultures to which it is adapted it is constructed to stand edge forward when attached to the gang-frame. The gang-frames herein illustrated are each adapted to receive and be equipped with teeth of this form so disposed and in such numbers as may be required to thoroughly cultivate entire row-spaces or stir the whole of given portions of the surface, as in the tillage of fallows, stubbles, orchards, and plantations of young trees set widely apart, or in preparing garden and other grounds, as well as for fining and leveling the surface of lands to be sown with grass and other seeds. In connection with other parts of my improved implement a pair of gang-frames equipped with this form of tooth constitute an effective "harrow-toothed cultivator."

I have shown my improved implement provided with singletrees for the attachment of four horses, described and claimed in United States Letters Patent No. 576,039, granted January 26, 1897, to myself and Morton R. Davis. While I do not herein claim this form of draft attachment per se, I have combined the same with a main frame in such a manner that the gang-frames may be attached to the front end of the main frame by draw-bars and are not interfered with by the construction of the draft appliance, but are permitted freedom of lateral and vertical movement, while the draft appliance is attached to the tongue both in front and in rear of the points of attachment of the gang-frames. The construction of the draft appliance is as follows: The singletrees 59 are adjustably attached to hangers 60, depending from the evener 61, which is pivoted at 62 to the tongue 2 in front of the draw-head 9. Each end of the evener 61 is provided with a section 63, pivoted to the evener 61 by the clevis 64, and to these sections the hangers 60 are directly secured. 65 represents an equalizing-bar pivoted to the tongue 2 at 66 in rear of the draw-head. At each end of the equalizing-bar 65 is a section 67, secured thereto by means of the clevis 68. From each end of each section 67 there extends a rod 69, the lower ends of which are respectively connected to the lower portions of the hangers 60. The evener 61 and the equalizing-bar 65 are each provided at each of their ends with a series of holes, as shown in Fig. 1, to receive, respectively, the clevis 64 and the clevis 68, so that the sections 63 and 67 of the evener and equalizing-bar, respectively, can at will be shifted in or out to adjust the position of horses to the width of row-spaces. By the arrangement described each animal attached to the implement travels between two rows of plants, while the high position of the evener and equalizing-bar provide necessary high-crop clearance. A central row is received between the two inner singletrees and a row on either side thereof between the outer end of the inner singletree and the inner end of the outer singletree on the respective sides of the implement.

While my improved implement is shown as provided with means for the attachment of the four horses required in tilling wide row-spaces and the whole of given portions of ground, yet I desire it understood that it is adapted to be used with two animals in the tillage of row-spaces of medium or narrow width, when the evener and equalizing-bar shown is dispensed with and a section 63 and a section 67 substituted.

Having thus described my invention, the following is what I claim as new therein and desire to secure by Letters Patent:

1. In an agricultural implement; the combination of a main frame mounted on wheels, gang-frames having draft connection with said main frame, a divided arch secured beneath the main frame, and braces adjustably secured to the depending arms of said arch which extend upwardly and rearwardly from said arms to adjustable connections with the rear part of the main frame; substantially as and for the purposes set forth.

2. In an agricultural implement; the combination of a suitably-mounted main frame, a draw-head secured to the main frame, gang-frames drawn by the main frame through the medium of draw-bars connecting them with the draw-head, an arch supporting the main frame and having wheels mounted on axles projecting from its vertical arms, and elevating means comprising flexible connections depending from the main frame, and equalizing lifting-bails spanning the gang-frames transversely; substantially as and for the purposes set forth.

3. In an agricultural implement; the combination of a wheeled main frame, a draw-head secured to the main frame, gang-frames connected with the draw-head and drawn by the main frame through means having rotative movement on said draw-head, and lifting-bails affording swinging connections for gang-frames with the main frame; substantially as and for the purposes set forth.

4. In an agricultural implement; the combination of a main frame, a divided arch, gang-frames drawn by the main frame and having openings formed by the disposition of the borders and bars of said frames, wheels traveling in said openings and mounted on axles projecting from depending arms of said arch, and a draw-head providing draft connection between said main frame and gang-frames, secured to the main frame in front of said arch and comprising a transverse bar, and sleeves rotatively mounted on said bar; substantially as and for the purposes set forth.

5. In an agricultural implement; a gang-frame comprising a substantially continuous border shaped to form converging sides, and intermediate longitudinal and transverse bars providing with said border an opening in the front portion of said frame adapted to have a wheel travel therein; said longitudinal bars bending in conformity with the converging ends, and reinforcing the same; substantially as and for the purposes set forth.

6. In an agricultural implement; a gang-frame comprising a substantially continuous border shaped to form converging sides, and intermediate longitudinal and transverse bars providing with said border an opening in the front portion of said frame adapted to have a wheel travel therein; said longitudinal bars bending in conformity with the converging ends, and reinforcing the same and extending forward and forming with said ends, an integral draw-bar; substantially as and for the purposes set forth.

7. In combination with an agricultural implement; a transverse draw-head attached at an intermediate point to a centrally-disposed portion of the implement and at its ends to the side of the implement and divided on opposite sides of said intermediate point, both transversely and concentrically, into an inner fixed portion or core, and two surrounding independently-rotative outer portions extending from the central point of attachment to the respective sides of the implement; substantially as and for the purposes set forth.

8. In combination with an agricultural implement; a transverse draw-head attached at an intermediate point to a centrally-disposed portion of the implement and at its ends to the side of the implement and divided on opposite sides of said intermediate point, both transversely and concentrically, into an inner fixed portion or core, and two surrounding independently-rotative outer portions extending from the central point of attachment to the respective sides of the implement, and gang-frames having draft connection with said draw-head through the medium of clamps laterally adjustable on the respective rotary portions of the draw-head, whereby the gang-frames are normally movable vertically and may be adjusted laterally at will; substantially as set forth.

9. In an agricultural implement; the combination of a main frame, the arch-carrying wheels at the lower ends of its downwardly-extending arms, gang-frames, a draw-head comprising inner continuous portion and outer independently-rotating parts, draft connections for the gang-frames clamped to and laterally adjustable on the respective rotatable parts of the draw-head, elevating mechanisms for the gang-frames and equalizing-bails interposed in said elevating connections; substantially as and for the purposes set forth.

10. In an agricultural implement; the combination of a main frame, an arch supporting the main frame and carrying wheels on axles projecting from its downwardly-extending arms, gang-frames carrying soil-stirring parts and having elevating connections with the main frame, a draw-head secured to the implement in front of the supporting-arch and concentrically divided into inner and outer portions, of which the outer portion is also divided transversely to form two portions adapted to rotate independently upon the inner portion, and draft connections between the respective gang-frames and the rotatable outer portions of the draw-head, which are laterally adjustable relatively to said rotatable portions; substantially as and for the purposes set forth.

11. In an agricultural implement; a gang-frame comprising a substantially continuous border shaped to form converging sides, intermediate longitudinal and transverse bars providing with said border a forwardly-disposed opening adapted to have a wheel travel therein, and longitudinal terminals adapted to have soil-stirring parts attached thereto; substantially as and for the purposes set forth.

12. In an agricultural implement; an attaching-bracket of approximately triangular form having a right-angular front leg and a diagonal brace, and with an integrally-formed tightening-clamp at the end of the front leg and diagonal brace; substantially as and for the purposes set forth.

13. In an elevating mechanism for the gang-frame of an agricultural implement; the combination of a rotating shaft and a lifting-arm having an integrally-formed clamping-socket by which it is mounted on said shaft and adapted to be adjusted laterally thereon in correspondence with lateral adjustment of the gang-frame with which it has connection; substantially as and for the purposes set forth.

14. In an elevating mechanism for an agricultural implement; a lifting-arm having an integrally-formed clamping-socket adapting it to be adjustably secured to a rotating member of said mechanism; substantially as and for the purposes set forth.

15. In combination with an agricultural implement; a laterally-adjustable elevating mechanism comprising a fixed bar suitably mounted at its ends, a tube rotatable on said fixed bar and extending between its mountings, means fixed upon one end of said tube for rotating said tube, and elevating connections laterally adjustable upon said tube; substantially as and for the purposes set forth.

16. In combination with the main frame of an agricultural implement; a centrally-disposed longitudinal member, gang-frames having connection with said main frame, an elevating mechanism for said gang-frames comprising non-rotating bars having their ends fixed between the centrally-disposed member and the sides of the main frame, a rotating tube sleeved upon each of said bars and extending between the mountings thereof, a lifting-arm secured laterally adjustable upon each of said tubes, a lever mounted upon the inner end of each of said tubes, and means for holding said lever in adjustment; substantially as and for the purposes set forth.

17. In an elevating mechanism for an agricultural implement; the combination of a round rod fixed between suitable mountings at its ends, a tube mounted rotatably on said rod and having a rectangular outer section, a lifting-arm, a rotating part having a rectangular clamp securing the arm laterally adjustable on said tube, a lever mounted on said rotating part, and means for holding said lever in adjustment; substantially as and for the purposes set forth.

18. In an agricultural implement; an elevating mechanism comprising a rotating tube or bar, a lifting-arm adjustably secured to said rotating part, a lever mounted on said rotating portion, and means for holding said lever in adjustment, said mechanism being adjustable both laterally and longitudinally; substantially as and for the purposes set forth.

19. In an agricultural implement; the combination of an elevating mechanism adjustable laterally and longitudinally, and a lifting-bail having connection with said mechanism and a soil-stirring device; substantially as and for the purposes set forth.

20. In an agricultural implement; the combination of an elevating mechanism longitudinally adjustable, and an auxiliary spring tending to actuate said mechanism, and also adjustable longitudinally of the implement; substantially as and for the purposes set forth.

21. In an agricultural implement; the combination of an elevating mechanism adjustable both laterally and longitudinally, and an auxiliary spring tending to actuate said mechanism and adjustable both laterally and longitudinally; substantially as and for the purposes set forth.

22. In an agricultural implement; the combination of a laterally-adjustable arch and braces having adjustable connections with the depending arms of said arch extending upwardly and rearwardly and having laterally-adjustable connections with the main frame; substantially as and for the purposes set forth.

23. In a wheeled agricultural implement; an arch having its vertical arms deflected over the hubs mounted on said arms; substantially as and for the purposes set forth.

24. In an agricultural implement; an arch having reversible axles secured in its lower ends and extensible inward and outward therefrom, whereby wheels may be disposed on said axles either exteriorly or interiorly to the vertical arms of said arch; substantially as and for the purposes set forth.

25. In an agricultural implement; a twin collar for attaching parts substantially as herein shown, comprising two split sockets, one circular and the other angular, suitably spaced apart in parallel relation to an integral web, and each having projecting lips and clamping-screws adapting each socket to be independently clamped on the part which it surrounds; substantially as and for the purposes set forth.

26. In an agricultural implement; a clamp adapted to adjustably secure shanks of soil-stirring parts to members of angle-bar section, and having a groove to receive the edge of one flange of said angle-bar; substantially as and for the purposes set forth.

27. In a wheeled agricultural implement; the combination with a swinging gang-frame, of a vertical hand-staff projecting rigidly from the gang-frame and an equalizing-bail holding the gang-frame level as it is deflected from the direct line of draft; substantially as and for the purposes set forth.

28. In a cultivator, the combination of a wheeled frame, a gang-frame having a centrally-disposed member connected to the front part of the wheeled frame and adapted to carry soil-stirring parts, an elevating mechanism having connection with said wheeled frame and the gang-frame, an evener and an equalizing-bar each pivoted to the centrally-disposed member of said wheeled frame and each having a section pivoted to each of its ends, hangers depending from the sections pivoted to the evener and provided with means for the attachment of singletrees, and rods extending from the ends of the sections pivoted to the equalizing-bar to said hangers, substantially as and for the purposes set forth.

29. In a cultivator; the combination of a wheeled main frame, a draft-tongue, gang-frames attached at the front of the main frame, an elevating mechanism for said gang-frames, and a device providing means for the attachment of four draft-animals, comprising an evener 61 pivoted to said tongue in front of the attachment of the gang-frames and having sections 63 pivoted to each of its ends, hangers 60 depending from the respective ends of the sections 63, singletrees 59 attached to the hangers, an equalizing-bar 65 pivoted to a centrally-disposed part of the implement in rear of the attachment of the gang-frames and having sections 67 pivoted at its ends, and rods 69 extending downwardly and forwardly from the ends of the sections 67 to the lower portions of hangers 60; substantially as and for the purposes set forth.

30. In a wheeled cultivator; the combination of a main frame, an arch supporting the main frame, wheels mounted on axles having connections with depending arms of the arch, gang-frames having draft connections with the main frame, a mechanism affording means for the vertical elevation of the gang-frames and having connection with the main frame, and a device adapted to provide means for the attachment of draft-animals without impeding the vertical movement of the gang-frames, comprising an evener 61 pivoted to a centrally-disposed portion of the implement and having a section 63 pivoted to each of its ends, hangers 60 depending from the ends of sections 63, singletrees 59 attached to hangers 60, an equalizing-bar 65 pivoted in rear of the evener 61 to a centrally-disposed part of the implement and having a section 67 pivoted to each of its ends, and rods 69 extending downwardly and forwardly from the respective ends of sections 67 to hangers 60; substantially as and for the purposes set forth.

31. In a wheeled cultivator, the combination of a main frame, an arch-bar beneath the main frame, an arch secured beneath the arch-bar, wheels mounted in the depending arms of the arch, a draw-head at the front of the main frame, gang-frames having draft connection with said draw-head and surrounding the respective wheels so that they travel within the borders of said frames, and carrying soil-stirring parts, elevating mechanisms providing connections between gang-frames and the main frame, and a device adapted to provide means for the attachment of draft-animals, comprising an evener 61 pivoted to a centrally-disposed part of the implement in front of the draw-head and having a section 63 pivoted to each of its ends, hangers 60 depending from the respective ends of sections 63, singletrees 59 attached to hangers 60, an equalizing-bar 65 pivoted to a centrally-disposed part of the implement in the rear of the draw-head and having sections 67 pivoted to its ends, and rods 69 extending downwardly and forwardly to connections with hangers 60; substantially as and for the purposes set forth.

32. In a wheeled cultivator; the combination of a main frame, an arch supporting the main frame and mounted on wheels, a concentrically-divided draw-head secured to the implement in front of the supporting-arch and adapted to provide draft connection between said main frame and gang-frames, a gang-frame having connection with the outer portion of said draw-head, an elevating mechanism providing flexible connection between the main frame and gang-frame, and a device adapted to afford attachment for draft-animals, comprising an evener and equalizing-bar respectively pivoted to a centrally-disposed part of the implement in front and rear of the draw-head and each having a section pivoted to each of its ends, hangers depending from the evener and provided with means for the attachment of singletrees, and rods extending from the sections attached to the equalizing-bar to connections with said hangers; substantially as and for the purposes set forth.

33. In an agricultural implement; a main frame having a tongue and comprising two parts, each providing a side and end portions of the frame, and having its flanges disposed horizontally and vertically, and having the ends of the end portions attached to the tongue by lapping the horizontal flanges beneath the tongue and projecting the vertical flanges longitudinally along the sides of the tongue; substantially as explained.

34. In an agricultural implement; the combination of a main frame, a rod or bar affording support for elevating mechanism, and the clamping-rack in which the end of said rod or bar is adjustably mounted, consisting of a pair of plates having in their contiguous edges corresponding semicircular clamping-sockets and means for holding said plates in position; as explained.

35. In an agricultural implement; the combination of a main frame, a rod or bar affording support for elevating mechanism, and the clamping-rack for holding the end of said rod or bar, consisting of two plates having their contiguous edges formed with corresponding semicircular depressions, one of said plates being provided with transverse end projections by which it is attached to the main frame; substantially as explained.

36. In an agricultural implement; the combination of a supporting-rod and a supporting-rack for said rod consisting of two parts having their adjacent edges provided with corresponding series of indentations or notches, and adapted to be secured in position to form sockets to receive the ends of said rod; substantially as and for the purposes set forth.

CHARLES WOOD DAVIS.

Witnesses:
S. E. JOCELYN,
M. R. DAVIS.